Nov. 9, 1965
J. HOEKSTRA　　3,216,801
PROCESS FOR PRODUCING HYDROGEN
Filed June 1, 1962
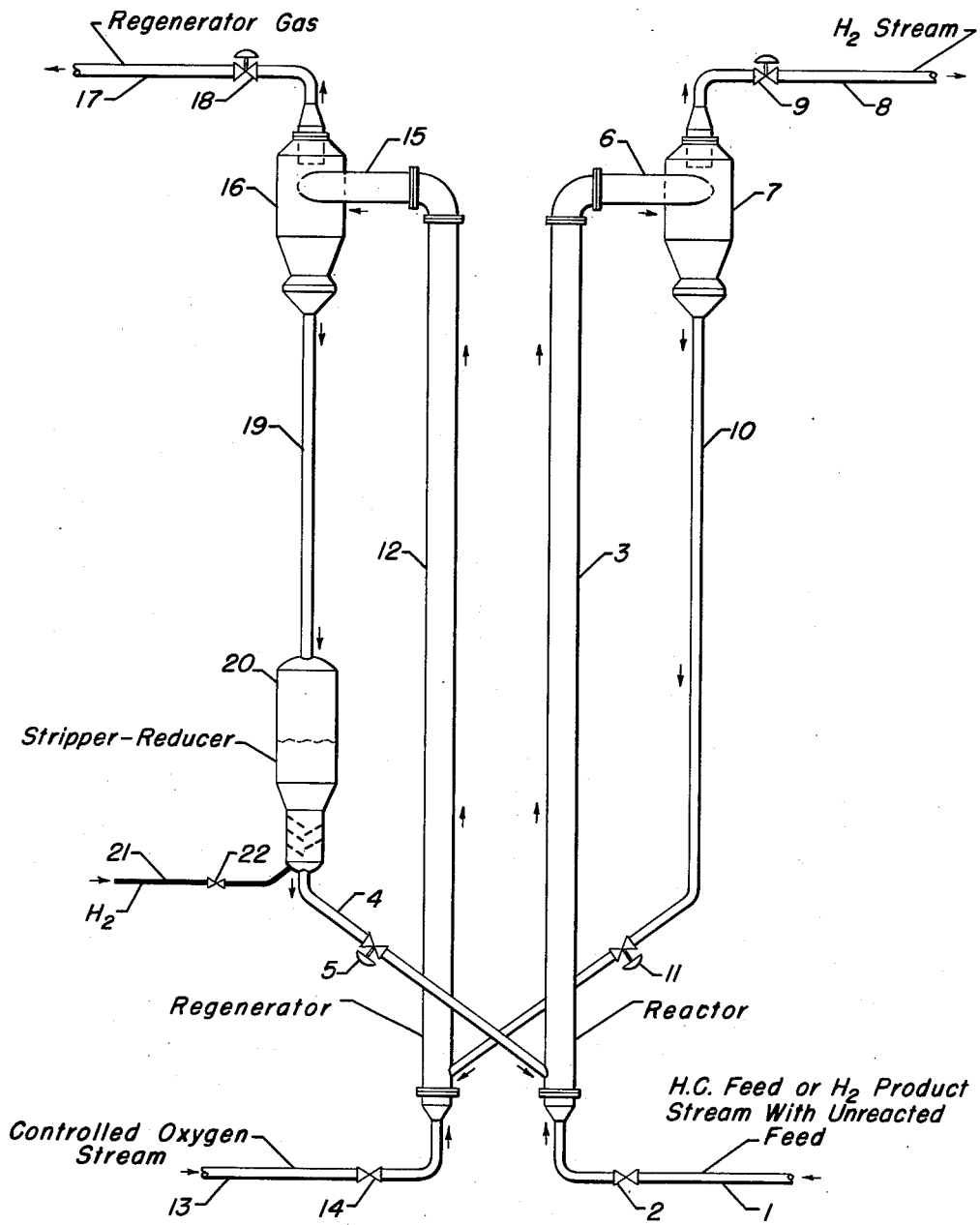
INVENTOR:
James Hoekstra
BY:
ATTORNEYS

United States Patent Office 3,216,801
Patented Nov. 9, 1965

3,216,801
PROCESS FOR PRODUCING HYDROGEN
James Hoekstra, Evergreen Park, Ill., assignor to Universal Oil Products Company, Des Plaines, Ill., a corporation of Delaware
Filed June 1, 1962, Ser. No. 199,529
5 Claims. (Cl. 23—212)

This invention relates to a process for producing hydrogen and more specifically to a special catalytic operation which provides for 100% conversion of methane or other hydrocarbon streams to hydrogen at high temperature and in the presence of molybdenum.

Commercial hydrogen production has in general made use of the water gas reaction, where carbon and steam are reacted together, or the shift reaction where carbon monoxide and steam are reacted together, although the prior art literature has taught various catalytic hydrocarbon decomposition methods for producing hydrogen and carbon black, or hydrogen with carbon deposition on the catalyst. In connection with such decomposition or cracking experimentation there has been the formation of the hydrogen and carbon by the use of nickel, iron, or other conventional catalyst, alone or on a refractory support. Also, in such test decomposition operations, there has been found a limitation to the hydrogen purity by reason of the thermodynamic equilibrium of the particular operation. For example, one published report shows a methane equilibrium chart where there was an observed 96±% hydrogen conversion when utilizing a nickel catalyst at a temperature of about 1560° F. In contrast to the foregoing type of conversion, the present invention provides a continuous hydrogen producing system by the use of a somewhat different catalytic reaction, i.e., the operation embodies a molybdenum containing catalyst to convert methane or other hydrocarbon streams such that conversion of 100% are readily achieved. The mechanism of the reaction appears to proceed at a high temperature in a manner to produce molybdenum carbide and hydrogen in accordance with the following formula:

$$CH_4 + Mo \rightarrow MoC + 2H_2$$

The molybdenum seems to have the ability to absorb the carbon as a carbide while with iron, nickel, cobalt and other conventional decomposition catalyst there is carbon deposition on the catalyst and/or the formation of carbon black.

It is therefore a principal object of this invention to produce a high yield of hydrogen in a metal catalyzed hydrocarbon decomposition reaction where the charge stream decomposes to form hydrogen and the metal carbide.

In order to provide a continuously operating system, it is necessary to decarbonize the molybdenum under controlled conditions of oxidation using air and/or carbon dioxide to obtain metallic molybdenum rather than an oxide of molybdenum. Actual test operations have proved that it is difficult to regulate the oxidation step to obtain the molybdenum since the carbon gasification and removal steps tend to readily effect a rapid transition of the molybdenum carbide to molybdic oxide ($MoO_2$) or to molybdic trioxide ($MoO_3$). Decarbonization with air appears to favor the formation of $MoO_3$ while regeneration with carbon dioxide appears to favor the formation of the $MoO_2$. Thus, a reduction step may frequently be necessary to obtain a metallic molybdenum suitable for reuse in the reaction zone for the additional production of hydrogen and the formation of the catalyst to molybdenum carbide.

Broadly, the present invention provides an improved method for producing a high yield of hydrogen from a light gaseous hydrocarbon charge stream in a manner which comprises contacting such stream at decomposition conditions with molybdenum containing catalyst particles to produce free hydrogen and molybdenum carbide on the particles, subjecting the resulting contacted catalyst particles to decarbonization at controlled conditions to thereby form particles containing metallic molybdenum and resubjecting such decarbonized molybdenum containing catalyst particles to contact with such charge stream for the further production of hydrogen.

In a somewhat more specific embodiment, the present invention provides a continuous method for producing a high yield of hydrogen from a light gaseous hydrocarbon charge stream in a manner which comprises, contacting such stream at decomposition conditions above about 1500° F. with molybdenum containing catalyst particles and providing the production of free hydrogen and molybdenum carbide on said particles, contacting the resulting particles in successive steps with an oxygen containing reactivating stream and with a reducing stream and effecting thereby the decarbonization thereof and the formation of particles containing metallic molybdenum, and resubjecting such reactivated catalyst particles to contact with said charge stream for further hydrogen production.

The catalytic conversion system may be carried out by the use of a non-fluidized moving bed operation wherein the catalyst particles are capable of being transferred by fluidized or mechanical lift means, as well as by gravity flow, or alternatively, in a fluidized system providing for the use of finely divided particles such that there is a dense phase bed of particles superimposed by a light phase zone of particles in one or more enlarged diameter contact chambers. In still another moving bed operation, the catalyst particles may be contacted in a dilute phase rising column of particles, where all of the catalyst is transferred to particle separation means permitting the recovered particles to flow by gravity to a successive contacting zone. It is also possible to utilize a fixed bed type of operation wherein one or more beds of particles are contacted successively with reactant and reactivating streams. Multiple beds with suitable switching apparatus will provide means for effecting a continuously operating system. In other words, it is not intended to limit the scope of the present improved continuous hydrogen producing system to any one specific apparatus embodiment.

The catalyst may carry molybdenum alone or as a composite with nickel, iron, cobalt, or other promoters which will assist in the hydrocarbon decomposition reaction and in the formation of the metal carbide. A preferred catalyst is one which is capable of withstanding the high conversion and regeneration temperatures which are encountered in a continuous hydrogen producing unit wherein temperatures may reach the order of 1700° F. or perhaps slightly higher, and yet not be excessively abrasive. Suitable refractory base materials may comprise alumina, silica-alumina, or alumina with silica and zirconia or one or more oxides of magnesium or titanium, alone or with any of the foregoing. Alternatively, alumina with oxides of chromium or vanadium may provide a desirable base material. Preferably, the promoting components, in addition to molybdenum, may comprise one or more metal oxides of the Sub-Group VIII metals of the Periodic Chart. Thus, as is noted hereinbefore, nickel, iron or cobalt compounds are advantageously used as a composite on the refractory base material. The size of the catalyst particles may vary in accordance with the type of apparatus system to be utilized for the conversion; however, for a fluidized contact and/or transportation of the particles, such particles will generally be less than about 3 mm. in average diameter.

Reactive metal components may be incorporated in any suitable manner, for example, by the use of commingling water soluble compounds of these components, particularly the nitrates, sulfates, chlorates, chlorides or carbonates, and soaking the support particles therein, followed by heating to effect drying and calcination. A subsequent prereducing step may be utilized to insure obtaining the molybdenum component on the support in a reduced state such that the carbide may be readily obtained in the hydrogen producing reaction. The molybdenum will generally be present in the range of from 5 to 25 percent, although greater or lesser amounts may be utilized in certain instances to provide a satisfactory conversion step. Other metal activating components will generally be present in small amounts of from 2 percent to 20 percent, although, again, greater or lesser amounts may be utilized in a particular catalyst, and it is realized that varying composites will provide varying efficiencies in carrying out the continuous process for effecting the hydrogen production and the metallic carbide formation.

In order to provide a high yield of hydrogen in the reaction zone and to preclude carbon oxides in the reaction product following decarbonization in the presence of a controlled oxygen containing stream, it is desirable to effect an efficient stripping and removal of adsorbed carbon oxides from the particles passing from the regenerator to the reaction zone. Nitrogen or other inert gaseous medium may be used to effect stripping of carbon oxides from the particle. It also appears that the molybdenum containing catalyst tends to readily change from the carbide to a molybdenum oxide without a direct formation of metallic molybdenum, thus a hydrogen stream may necessarily be utilized as a stripping-reducing medium to contact the catalyst particles after regeneration and prior to their reuse in the reaction zone.

In view of the hydrogen requirements for stripping and reducing the decarbonized catalyst, the present hydrogen producing system may be desirably utilized in combination with one or more additional hydrogen producing systems. Such other systems may, for example, employ a different catalytic procedure or alternatively, a thermal conversion process for the production of hydrogen from a hydrocarbon charge stream. In other words, the present highly efficient conversion system may be utilized to effect a final "clean-up" operation to insure the complete conversion of unreacted methane or other hydrocarbon components in the product stream from a first stage producing unit where thermodynamic equilibrium precludes 100% conversion of the charge stream to hydrogen and carbon.

Reference to the accompanying drawing will serve to set forth one embodiment of a continuous catalytic processing system as well as advantageous features which may be obtained in connection therewith.

A hydrocarbon feed stream, such as methane or a hydrogen rich product stream from a prior stage hydrogen producing unit, may be charged to the present unit by way of line 1, having valve 2, so as to pass vertically upward through the elongated reactor chamber 3 to become commingled with catalyst particles flowing thereto by way of line 4 and control valve 5. The feed stream contact with the catalyst particles is effected at a high temperature preferably above about 1500° F. such that there is a relatively short contact time effected as the charge stream and particles pass in a dilute phase rising column upwardly through reactor 3 to the transfer line 6 and thence into particle separating means 7. The feed stream may be preheated; however, the catalyst particles are preferably returned to the lower end of the reactor 3 at a high temperature providing the necessary endothermic heat for the desired reaction in the elongated chamber 3. In accordance with the present invention, the cataylst particles used in the system contain molybdenum in an amount to provide efficient catalytic decomposition of the hydrocarbon charge stream to produce free hydrogen and effect the formation of molybdenum carbide on the particles themselves.

The contacted stream from chamber 3 is separated within the separator 7 to provide an overhead hydrogen rich product stream which is substantially free of any of the charge material. Such product stream is discharged by way of line 8 having control valve 9 while resulting carbide containing catalyst particles are permitted to descend from the lower end of particle separating means 7 into a standpipe 10, having control valve 11, to in turn provide for the continuous introduction of particles into a regenerator chamber 12. A suitable oxygen containing reactivating stream which may comprise air and/or $CO_2$ is introduced into the lower end of regenerator 12 by way of line 13 having valve 14. As in connection with the reaction chamber, the present apparatus embodiment provides for the contacting of the carbide containing catalyst to take place in a rising dilute phase column of the reactivating gas and the particles with a subsequent transfer by way of line 15 and particle separator 16.

The introduction of the reactivating gas stream and the contact carried out within the regenerator 12 is carefully controlled as to quantity, composition and contact time so as to effect the substantially complete gasification and removal of carbon from the catalyst particles as well as the obtention of substantially metallic molybdenum on the catalyst particles for reuse in the reaction section of the system. The decarbonization may be accomplished by the use of a diluted air stream or by the use of $CO_2$ such that carbon is removed primarily as carbon monoxide from the upper end of the regenerating zone 12. It is undesirable to have excess air when contacting the molybdenum carbide and effect the formation of molybdenum oxides on the particles, inasmuch as it is then necessary to effect the reduction of the molybdenum oxides prior to the particles being returned to the reaction zone.

From the particle separator 16, the resulting regeneration gas stream passes overhead by way of line 17 and control valve 18 while decarbonized particles pass from the lower end thereof by way of standpipe 19 into stripping-reducing chamber 20. Hydrogen or other reducing gas is introduced into the lower end of the stripping chamber 20 by line 21 having valve 22, in order to strip any occluded carbon oxides and to insure the reduction of the catalyst particles prior to passing by way of line 4 into reaction chamber 3. In an alternative operation, nitrogen or other inert medium may be utilized upstream in the stripping-reducing section so that minimal quantities of hydrogen may be used in the lower reducing section of zone 20. It may be further noted in connection with the present embodiment that an enlarged diameter section is used in the upper portion of stripper-reducer 20 such that there may be some built-in storage of catalyst particles in the continuous circulating system. The level of particles in such enlarged upper portion may be permitted to vary upwardly or downwardly in accordance with a circulation rate maintained in the system.

Various control systems may be utilized in connection with the unit. For example, increased or decreased particle circulation rates may be obtained responsive to or in accordance with temperature requirements, charge rates, product purity, etc., and it is not deemed necessary to indicate any specific control system in connection with the accompanying diagrammatic drawing. Also as pointed out hereinabove various apparatus arrangements may be utilized to carry out the catalytic decomposition reaction and it is not intended to limit the improved conversion system to the use of any one type of apparatus design to any one physical relationship of chambers. Various types of particle separating means may also be incorporated into a moving bed operation, with such separating means having one or more stages in order to preclude any substantial loss of catalyst particles from the system.

In order to further illustrate the advantage of the present invention, test operations were carried out in a test unit provided to hold approximately 300 cc. of catalyst in a high temperature resistant Vycor tube. The catalyst in the tube being subjected in successive steps; firstly to contact with a methane charge stream; secondly, to contact with an oxygen containing stream comprising nitrogen with 3% of oxygen and, thirdly, to contact with hydrogen. A nitrogen purge stream then followed the hydrogen reducing stream. The controlled oxygen containing stream effects the decarbonization of the catalyst particles while the subsequent hydrogen stream insured the reduction of molybdenum on the catalyst particles prior to effecting the contact with the hydrocarbon charge.

*Example I*

In a first test operation, the catalyst utilized comprised 12% molybdenum, by weight, and 4% nickel, by weight, on an alumina-silica base which comprised 88% alumina. A test of the product stream resulting from contacting such catalyst showed that 100% of the methane had been converted to hydrogen. Decarbonization of the contacted catalyst was effected by charging a carbon dioxide stream through the bed for a 180-minute period and such decarbonization was followed by a contact with hydrogen for a 60-minute period. In a second cycle of the test operation, the methane charge was again subjected to 100% conversion of the methane to hydrogen.

*Example II*

In a different test run, a catalyst similar to that used in Example I was tested in the apparatus for the conversion of a methane charge stream and again there was found to be, at the end of the first cycle, 100% of methane conversion to hydrogen. In the regeneration step an oxygen containing nitrogen stream, as described hereinabove, was used to decarbonize the catalyst, while hydrogen was again used to effect a reduction of the catalyst particles prior to a reintroduction of the charge stream. In a second cycle of operation, there was a 99% conversion of methane to hydrogen.

*Example III*

In still another test operation, the catalyst composite comprised 12% molybdenum, by weight, and 4% nickel, by weight, on a refractory alumina base material. Upon the introduction of methane for a 15-minute period through the catalyst bed there was found to be 100% conversion of the methane to hydrogen. In this test a carbon dioxide stream was used to effect the decarbonization of the particles after the first cycle of operation. In accordance with prior procedure, the decarbonized catalyst was subjected to 60 minutes of hydrogen contact before a second cycle introduction of the methane charge stream. At the end of the second cycle of operation there was found to be 96% conversion of the methane charge.

From the foregoing examples, it may be seen that the molybdenum containing catalyst was highly effective in providing for the substantially 100% conversion of the methane charge stream and that high yields of hydrogen were obtainable by the decomposition of methane to hydrogen and for the formation of a molybdenum carbide on the catalytic particles. Analytical X-ray tests carried out on the contacted catalyst particles at the end of the conversion step showed that molybdenum carbide was present on the particles. The tests also showed that a controlled oxygen content reactivating stream, or a $CO_2$ stream, appeared to be equally effective for carrying out the decarbonization of the particles whereby the molybdenum content of the catalyst particles could be reused in successive cycles in a continuous processing system.

I claim as my invention:

1. A continuous method for producing a high yield of hydrogen from a light gaseous hydrocarbon charge stream which comprises, contacting such stream at decomposition conditions with molybdenum containing catalyst particles to produce free hydrogen and molybdenum carbide on said particles, contacting the resulting catalyst particles in successive steps with a reactivating stream containing a controlled quantity of oxygen and then with a reducing stream and effecting thereby the decarbonization thereof and the formation of particles containing metallic molybdenum, and resubjecting such reactivated catalyst particles to contact with said charge stream for further hydrogen production therefrom.

2. A continuous method for producing a high yield of hydrogen from a light gaseous hydrocarbon charge stream which comprises, contacting such stream at decomposition conditions above about 1500° F. with molybdenum containing catalyst particles to provide production of free hydrogen and molybdenum carbide on said particles, subjecting the resulting catalyst particles to contact with an oxygen containing stream at controlled conditions to effect the decarbonization of said catalyst particles, further subjecting the resulting decarbonized catalyst particles to contact with a stripping and reducing stream to remove carbon oxides from said particles and to insure the formation of metallic molybdenum thereon, and resubjecting such reactivated catalyst particles to contact with said charge stream for further production of hydrogen.

3. The method of claim 1 further characterized in that said catalyst particles contain a promoter selected from the group consisting of nickel, iron and cobalt.

4. A continuous method for producing a high yield of hydrogen from a light gaseous hydrocarbon charge stream which comprises, contacting such stream at decomposition conditions with molybdenum containing catalyst particles to produce free hydrogen and molybdenum carbide on said particles, contacting the resulting catalyst particles with oxygen at conditions to convert molybdenum carbide to molybdenum oxide, thereafter contacting the catalyst particles with a hydrogen-containing reducing gas to reduce said oxide to metallic molybdenum, and contacting the thus reactivated catalyst particles with an additional quantity of said charge stream as aforesaid for the further production of hydrogen.

5. The method of claim 4 further characterized in that said catalyst particles contain a promoter selected from the group consisting of nickel, iron and cobalt.

References Cited by the Examiner

UNITED STATES PATENTS

| | | | |
|---|---|---|---|
| 2,671,014 | 3/54 | Watson | 23—212 X |
| 2,783,133 | 2/57 | Eastwood | 23—212 |

MAURICE A. BRINDISI, *Primary Examiner.*